United States Patent

[11] 3,588,816

[72] Inventor Raymond H. Himes
15 Merrimac St., Buffalo, N.Y. 14214
[21] Appl. No. 742,271
[22] Filed July 3, 1968
[45] Patented June 28, 1971

[54] MONITOR SYSTEM FOR VEHICLE LIGHTS
4 Claims, 1 Drawing Fig.

[52] U.S. Cl. ...................................................... 340/80,
315/131, 340/67, 340/176, 340/251
[51] Int. Cl. ........................................................ B60q 1/04,
B60q 1/38, G08b 21/00
[50] Field of Search .......................................... 340/80,
164, 176, 251, 252; 324/22, 51; 315/77, 130—132

[56] References Cited
UNITED STATES PATENTS
1,647,300 11/1927 Kroupa ............................ 340/252
2,456,499 12/1948 Fritzinger ..................... (340/176UX)
2,623,099 12/1952 Wallace et al. ................ 324/51
2,823,304 2/1958 Shiels ............................ 324/22
2,841,764 7/1958 Heimberger ................... 324/51
3,040,243 6/1962 Weiss ............................ 324/51X
3,109,158 10/1963 Coombs ........................ 340/80X
3,355,708 11/1967 Perry ............................ 340/80
3,457,561 7/1969 Zeisler ......................... 340/80X Primary Examiner—John W. Caldwell
Assistant Examiner—Kenneth N. Leimer
Attorney—Bean & Bean ABSTRACT: A system for checking the operation of exterior running and/or signal lights of motor vehicles, aircraft, trailers, boats, and the like; which is characterized by a performance indicator employed in combination with a switching arrangement adapted to successively place the indicator in circuit with the filaments of the various lights to be checked.

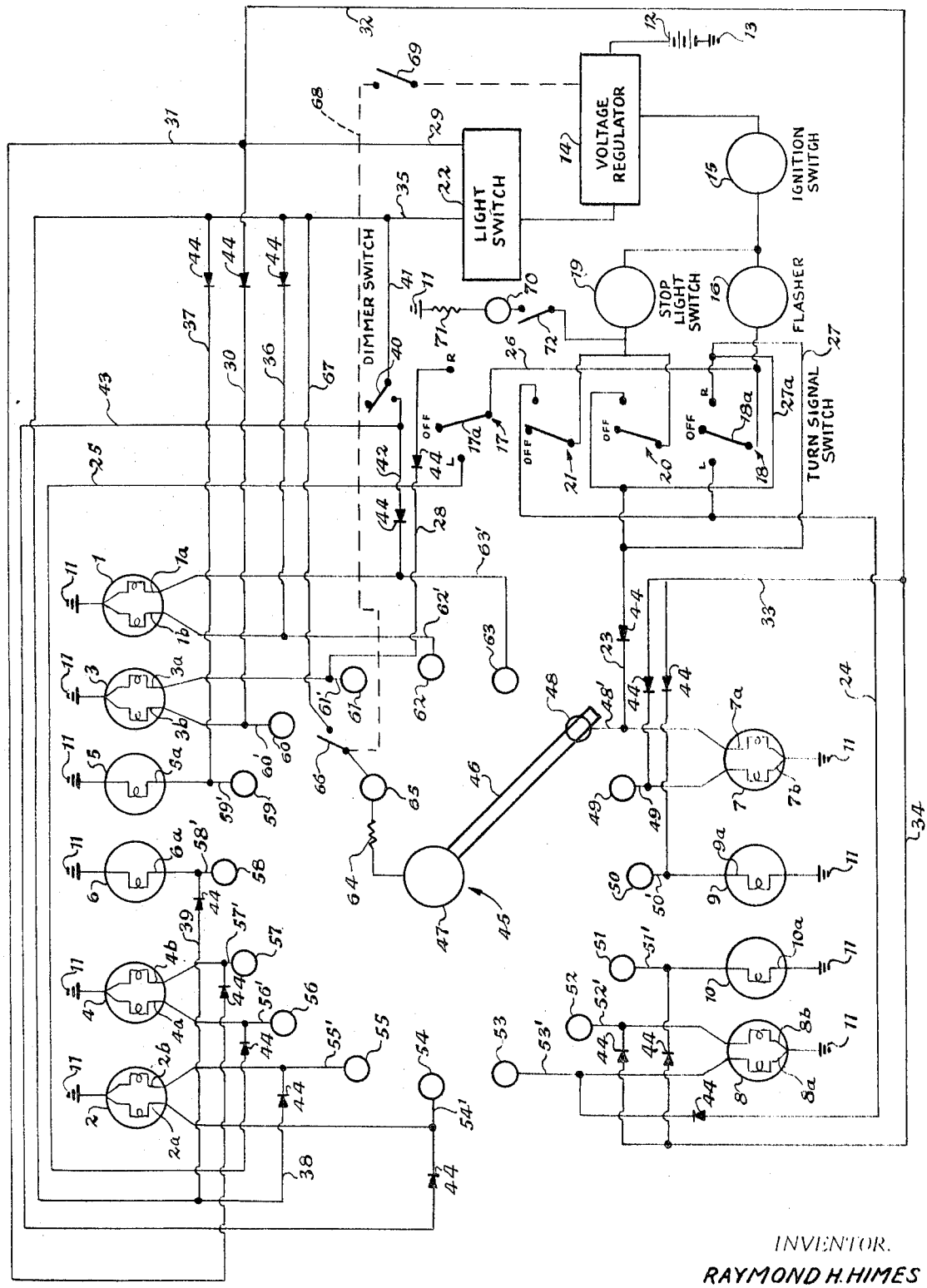

MONITOR SYSTEM FOR VEHICLE LIGHTS

BACKGROUND OF THE INVENTION

Heretofore, various systems have been proposed for use in spot checking the exterior running and signaling lights of a vehicle, which are disposed out of view of an operator. However, previous arrangements have proven unsatisfactory because they are complicated and expensive to install and maintain and tend to be misleading or otherwise undesirable under certain conditions of operation.

Numerous prior systems include photocell or heat sensing type monitors provided for each vehicle light to be monitored. Photocell type monitors have proven unreliable due to the incidence of light reflections on the light lens from external light sources, and due to the depositing of snow, ice, dirt, etc. on the photocell and/or on the light to be monitored. Not only do these prior systems entail great expense, due to the necessary provision of a monitoring device adjacent each vehicle light to be checked, but they are only operative while the vehicle lights are on and there is no way for the vehicle operator to check the performance of an individual monitor without his leaving the inside of the vehicle.

More recently, it has been proposed to display on the dashboard of a vehicle, the outline of such vehicle as viewed from above and provide indicator lights positioned thereon in locations corresponding to the external vehicle lights. While this system does permit instantaneous inspection of the vehicle lights, there is no provision of means to determine in the case where an indicating light fails to light whether the indicator light or the exterior vehicle light has burned out. Also, this type of system suffers from the same drawback as those systems discussed above in that there is necessarily provided a separate indicator for each external vehicle light to be tested.

SUMMARY OF THE INVENTION

The present invention is directed towards an improved system for checking the operation of vehicle running and/or signal lights which overcomes disadvantages of prior systems.

Specifically, there is provided a rotary switching arrangement which is adapted to place a single indicating light in circuit with the filaments of each of the exterior vehicle lights to be monitored.

DESCRIPTION OF THE DRAWING

The nature and mode of operation of the monitoring system according to the present invention will be more fully understood with reference to the following description taken with the accompanying drawing, which schematically illustrates a typical vehicle lighting circuit having incorporated therein a rotary switching arrangement adapted to successively place a single indicating light in circuit with the filaments of the vehicle lights to be monitored.

DETAILED DESCRIPTION OF THE INVENTION

In the drawing there is shown for purposes of illustration, a lighting system for a plurality of exterior vehicle lights, including a right front headlight 1 having a bright filament 1a and a dim filament 1b; a left front headlight 2 having a bright filament 2a and a dim filament 2b; a right front park and turn signal light 3 having a turn signal filament 3a and a parking filament 3b; a left front park and turn signal light 4 having a turn filament 4a and a parking filament 4b; a second right front headlight 5 having a filament 5a; a second left front headlight 6 having a filament 6a; a right rear stop, tail and turn signal light 7 having a stop and turn signal filament 7a and a tail light filament 7b; a left rear stop, tail and turn signal light 8 having stop and turn filament 8a and a tail light filament 8b; a second right rear tail light 9 having a filament 9a; and a second left rear tail light 10 having a filament 10a. The filaments of each of the exterior lights may be suitably connected ground, as indicated at 11.

Further, for purposes of illustration, the lighting system is shown as including a battery 12, which is connected to a common ground 13, and a voltage regulator 14. Voltage regulator 14 is connected in series with an ignition switch 15, a flasher 16, and a turn signal switch having simultaneously operable forward and rear switch elements, generally indicated as 17 and 18, respectively. Also, directly connected to voltage regulator 14 in series with ignition switch 15, but in parallel with flasher 16, is a conventional stop light switch 19 having right stop and left stop switch elements, generally indicated as 20 and 21, respectively, which are normally actuated by operation of the foot brake pedal of the vehicle. Connected directly to the voltage regulator 14 and arranged in parallel with the ignition switch circuit is a conventional off-multiposition on light switch 22, which is connected in series to certain of the filaments of the exterior lights, as will be hereinafter described.

It will be understood that upon actuation of the foot brake pedal of the vehicle, right and left stop switch elements 20, 21 are moved from their normal "off" positions, shown in full line in the drawing, so as to connect right stop filament 7a and left stop filament 8a to the ignition circuit via conductors 23 and 24, respectively.

Further, by referring to the drawing, it will be understood that upon actuation of the turn signal of the vehicle, the contact arms 17a and 18a of turn switch elements 17 and 18 respectively, are simultaneously moved from their "off" positions, illustrated in full line in the drawing, to either their left- L or right- R hand switching position. Thus, for instance when moved into left-hand switching position, left rear stop and turn signal filament 8a is connected to the ignition circuit via conductor 24, and the left front turn signal filament 4a is connected to the ignition circuit via conductors 25 and 26.

Alternatively, when the turn switch elements 17 and 18 are shifted to their right turn positions, right rear stop and turn signal filament 7a is connected to the ignition circuit via conductor 23 and conductors 27 or 27a, and right front turn filament 3a is connected to the ignition circuit via conductor 28.

When light switch 22 is in a first "on" or temporary night park position, it is electrically connected to front parking light filaments 3b and 4b via conductors 29, 30 and 29, 31, respectively; to right tail light filaments 7b and 9a via connectors 29, 32, 33; and to left tail light filaments 8b and 10a via conductors 29, 32, 34.

When light switch 22 is moved into its second "on," or normal night running position, it is electrically connected to right front headlight dim filament 1b via conductors 35, 36; to second right front headlight filament 5a via conductors 35, 37; to left front headlight dim filament 2b via conductors 35, 38; and to second left front headlight filament 6a via conductors 35, 39. Also, light switch 22 may be electrically connected to the right and left front headlight bright filaments 1a and 2a upon actuation of dimmer switch 40 via conductors 35, 41, 42 and conductors 35, 41, 42, 43, respectively.

If desired, when light switch 22 is in its second "on" position current may also flow through conductor 29 in order to illuminate the parking filaments 3b, 4b and tail light filaments 7b, 8b, 9a, 10a.

For the purpose hereinafter discussed, the conventional lighting system thus far described is modified by providing a plurality of rectifiers 44 in series with each of the filaments of lights 1—10, which permit flow of current only towards the individual filaments.

Referring again to the drawing, it will be seen that in accordance with the present invention, there is provided an exterior vehicle light condition indicating or monitoring circuit, which includes a rotary switch, generally indicated as 45, having a rotating contact arm 46 and a control knob 47, which is adapted to be manually rotated by a vehicle operator in order to position contact arm 46 in contact successively with a plurality of electrical terminals 48—63. Terminals 48—63 are arranged in a circular pattern and connected by lead conductors 48'—63' in series with light filaments 7a, 7b, 9a, 10a, 8b, 8a, 2a, 2b, 4a, 4b, 6a, 5a, 3b, 3a, 1b and 1a, respectively.

Provided in a series with contact arm 46 are a voltage controlling resistance 64, a single monitoring or indicator light 65 and a manually operated switch 66, which may be employed to selectively place contact arm 46 in series with light switch 22 via conductors 67 and 35.

Manually operable control knob 47 of switch 45, switch 66, and indicator light 65 are preferably mounted on or within the dashboard of a vehicle in a position in which they may be readily observed and be accessible to the vehicle operator.

When an operator desires to monitor the condition of any of the exterior light filaments, he need merely close switch 66, assuming light switch 22 is turned on, and thereafter rotate knob 47 in order to successively place contact arm 46 in electrical contact with any of terminals 48—63. In the position of the contact arm shown in the drawing, indicator light 65 is placed in series with right rear stop and turn signal filament 7a. If indicator light 65 is not illuminated, the operator immediately knows that the right stop and turn filament 7a is burned out, loose or otherwise defective, since, in order to complete the circuit through light 65, current must pass through filament 7a to ground 11. In this respect, it will be noted that the provision of a rectifier 44 in connector 23 prevents the flow of current through any of light filaments 8a, 3a or 4a, which would be placed in parallel with filament 7a if during monitoring an operator should actuate the turn signal or the brake pedal. Further, by way of illustration, if the operator rotates contact arm 46 in a clockwise direction, into engagement with terminal 51, indicator light 65 is placed in series with the left tail light filament 10a. If indicator light 65 is not illuminated the operator immediately knows that the left tail light filament has burned out. Again, the presence of a rectifier prevents a current from flowing through parallel left tail light filament 8b, which would permit a misleading illumination of indicator light 65.

The condition of indicating light 65 may itself be checked by placing contact arm 46 in electrical contact with for instance, terminal 48, when ignition switch 15 is on, and thereafter actuating either the vehicle foot brake or the right turn signal in order to illuminate right stop and turn filament 7a. If the operator perceives that the normal dashboard lights, not shown, which indicate operation of the turn signals are illuminated or that the dash mounted brake light normally associated with stop light switch 19 is illuminated at a time when the indicator light 65 is not illuminated, he immediately knows that indicator light 65 has burned out and must be replaced. While numerous other circuit arrangements might be provided to ascertain at any given time whether the indicator light itself is burned out, it is believed to be practically unnecessary since the life time of the indicator light will be substantially in excess of that of the exterior light filaments, since it is used less frequently and for shorter periods of time.

Alternatively, rotary switch 45 may be directly connected to voltage regulator 14, thus by passing switches 22 and 66, via conductor 68, shown in dashed line in the drawing, and switch 69. This arrangement permits a vehicle operator to check each of the exterior vehicle lights without the necessity of first both turning on light switch 22 and closing indicating circuit control switch 66. Preferably, switches 66 and 69 are adapted to be simultaneously actuated by the vehicle operator by use of a suitable dashboard mounted control, not shown, such that when switch 66 is opened, switch 69 is closed. Thus, when the vehicle is parked with its exterior lights off, the operator may monitor such lights by closing switch 69 while opening switch 66 in order to prevent the passage of current to the filaments of the forward vehicle lights. Thereafter, the operator may open switch 69 to prevent a drain on battery 12.

Further, in accordance with the present invention, stop light switch 19 may be independently checked, when ignition switch 15 is on, by means of a second monitoring circuit including a second indicator light 70, a resistor 71, which is grounded at 11, and a switch 72, which may be placed on the vehicle dashboard, so as to afford ready access thereto by an operator.

It should be emphasized that during vehicle operation it is preferable to maintain switch 66 closed and contact arm 46 in engagement with either of terminals 48 or 53, in order to continuously monitor the rear stop and turn filaments 7a and 8a, respectively.

While the monitoring system of the present invention has been primarily described with respect to its use in a passenger vehicle lighting system, it will of course be understood that the monitoring system may readily be employed to monitor the lights of a towed vehicle, such as a trailer. In the latter case, a suitable indicator light and control switch would also be mounted on or adjacent to the dashboard of the towing vehicle to facilitate observation by an operator. Also, it will be understood that various changes may be made to the monitoring system described without departing from the spirit of the invention or the scope of the appended claims.

I claim:

1. In a vehicle having a lighting system including a DC voltage source, at least two light filaments connected at one side thereof to one side of said voltage source, and switch means for selectively connecting the other sides of said light filaments to the other side of said voltage source for operation of said filaments in normal manner, the improvement which comprises:

a test circuit for testing electrical continuity individually and selectively through either one of said filaments, and a blocking diode in the vehicle lighting circuit of each filament to prevent unwanted energization of one of said filaments while the other is being tested and vice versa;

said test circuit including a pair of contacts, one connected to each of said filaments at said other side thereof, a test contact selectively engageable with either one of the contacts of said pair of contacts, and a test lamp;

each blocking diode being connected in series with the lighting circuit to its associated filament; and said test lamp being connected in parallel across a selected blocking diode in response to engagement between said test contact and that one of the pair of contacts associated with said selected diode.

2. In the system as defined in claim 1 wherein a switch is provided in said test circuit for connecting said test lamp and said test contact directly in series with a selected filament and said DC voltage source when said switch means of the vehicle is open.

3. The system as defined in claim 1 wherein said switch means is a turn signal indicating switch and said filaments are turn indicator light filaments.

4. The system as defined in claim 1 wherein said filaments are headlamp filaments and said switch means is the headlight switch.